(12) United States Patent
Dhokate et al.

(10) Patent No.: US 12,332,547 B2
(45) Date of Patent: Jun. 17, 2025

(54) METHODS AND SYSTEMS FOR LIGHT SOURCE DIAGNOSTICS

(71) Applicant: BLANCCO TECHNOLOGY GROUP IP OY, Joensuu (FI)

(72) Inventors: Harshal Dhokate, Maharashtra (IN); Prateek Tomar, Maharashtra (IN)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 311 days.

(21) Appl. No.: 18/022,077

(22) PCT Filed: Jul. 29, 2021

(86) PCT No.: PCT/EP2021/071282
§ 371 (c)(1),
(2) Date: Feb. 17, 2023

(87) PCT Pub. No.: WO2022/037919
PCT Pub. Date: Feb. 24, 2022

(65) Prior Publication Data
US 2023/0367182 A1     Nov. 16, 2023

(30) Foreign Application Priority Data
Aug. 18, 2020 (GB) .................................. 2012902

(51) Int. Cl.
*G03B 15/05* (2021.01)
*G03B 43/00* (2021.01)
*H04N 23/74* (2023.01)
(52) U.S. Cl.
CPC ............. *G03B 15/05* (2013.01); *G03B 43/00* (2013.01); *H04N 23/74* (2023.01)
(58) Field of Classification Search
CPC ......... G03B 15/05; G03B 43/00; H04N 23/74
See application file for complete search history.

(56) References Cited

U.S. PATENT DOCUMENTS

2017/0300766 A1* 10/2017 Kang ................... B60Q 11/005
2018/0288848 A1* 10/2018 Gao ......................... B60Q 1/26
(Continued)

FOREIGN PATENT DOCUMENTS

| EP | 3388814 | 10/2018 |
|---|---|---|
| JP | 2005-072767 | 3/2005 |

(Continued)

OTHER PUBLICATIONS

Notice of Reasons for Refusal / Japanese Office Action dated Feb. 3, 2025, (Feb. 3, 2025), 10 pages (including English Translation), issued on related Japanese patent application 2023-512202 by the Japanese Patent Office.

*Primary Examiner* — Alexander H Taningco
*Assistant Examiner* — Pedro C Fernandez
(74) *Attorney, Agent, or Firm* — DICKINSON WRIGHT PLLC (57) ABSTRACT

A method for use in testing an operational status of a light source for illuminating a scene, comprises using a camera to capture a first image when the light source is disabled, the light source having a fixed spatial relationship relative to the camera, and using the camera to capture a second image when the light source is enabled. The method comprises determining a test result indicating the operational status of the light source based at least in part on a light source setting when the camera captures each of the first and second images, the light source setting indicating whether the light source is disabled or enabled when the camera captures the first and second images and at least one of: one or more camera settings when the camera captures the first and second images, and one or more image properties of the first and second images. Such a method may be used for testing the operational status of a light source and, in particular, though not exclusively, for use in automatically testing the (Continued)

operational status of a camera flash of a mobile electronic device.

24 Claims, 7 Drawing Sheets

(56) References Cited

U.S. PATENT DOCUMENTS

| | | | | |
|---|---|---|---|---|
| 2018/0290583 | A1* | 10/2018 | Park | G01M 11/064 |
| 2021/0264639 | A1* | 8/2021 | Miginnis | G03B 43/00 |

FOREIGN PATENT DOCUMENTS

| | | |
|---|---|---|
| JP | 2018-082233 | 5/2018 |
| WO | 2020101633 | 5/2020 |

* cited by examiner

METHODS AND SYSTEMS FOR LIGHT SOURCE DIAGNOSTICS

CROSS REFERENCE TO RELATED APPLICATIONS

This application is a U.S. National Phase patent application of and claims priority to PCT/EP2021/071282, filed Jul. 29, 2021, and United Kingdom patent application Serial No. 2012902.9, filed Aug. 18, 2020, all of which are hereby incorporated by reference in the present disclosure in their entirety.

FIELD

The present disclosure relates to a method, a system, a diagnostics application, and a device such as a mobile electronic device for use in testing the operational status of a light source and, in particular, though not exclusively, for use in automatically testing the operational status of a camera flash of a mobile electronic device.

BACKGROUND

It is known to perform a manual diagnostic test or check of a camera flash of a mobile electronic device in which a user or operator of the mobile electronic device needs to provide feedback indicating whether or not the camera flash of the mobile electronic device actually operates when enabled. However, such manual diagnostic tests or checks are time-consuming and are susceptible to human error or fraud.

SUMMARY

According to an aspect of the present disclosure there is provided a method for use in testing an operational status of a light source for illuminating a scene, the light source having a fixed spatial relationship relative to a camera, and the method comprising:
  using the camera to capture a first image when the light source is disabled;
  using the camera to capture a second image when the light source is enabled; and
  determining a test result indicating the operational status of the light source based at least in part on:
  a light source setting when the camera captures each of the first and second images, the light source setting indicating whether the light source is disabled or enabled when the camera captures the first and second images; and
  at least one of:
    one or more camera settings when the camera captures the first and second images; and
    one or more image properties of the first and second images.

Such a method may be used for testing the operational status of a light source and, in particular, though not exclusively, for use in automatically testing the operational status of a camera flash of a mobile electronic device.

The one or more camera settings may comprise an ISO setting of an image sensor of the camera, an exposure index of an image sensor of the camera, a sensitivity setting of an image sensor of the camera, or a gain setting of an image sensor of the camera.

The one or more camera settings may comprise a shutter speed or an exposure time of the camera.

The one or more camera settings may comprise an aperture setting, an f-stop, or an f-number of the camera.

The one or more image properties may comprise an image brightness parameter.

The image brightness parameter may comprise an average brightness of an image or an average intensity of an image, or an average brightness or an average intensity of a pre-defined portion or a pre-defined area of an image.

The one or more image properties may comprise an image file size.

The method may comprise reading the first and second images from the camera.

The method may comprise determining, for each of the first and second images, the light source settings, the one or more camera settings, and the one or more image properties.

The method may comprise extracting from metadata associated or stored with each of the first and second images, the light source settings, the one or more camera settings, and the one or more image properties for each of the first and second images.

The method may comprise reading the light source settings, the one or more camera settings, and the one or more image properties for the first and second images from the camera.

The method may comprise determining the image properties of the first and second images from image data of the first and second images.

The method may comprise determining whether the first and second images are images of the same scene.

The method may comprise:
  determining, for each of the one or more camera settings, whether a camera setting difference between a camera setting value associated with the first image and a camera setting value associated with the second image complies with a corresponding predetermined camera setting criterion; and
  determining, for each of the one or more image properties, whether an image property difference between an image property value associated with the first image and an image property value associated with the second image complies with a corresponding predetermined image property criterion.

The method may comprise selecting each predetermined camera setting criterion and each predetermined image property criterion based at least in part on the corresponding camera setting value and/or the corresponding image property value when the camera captures the first image. This may be advantageous where the first image captures a scene which is relatively bright.

The method may comprise determining a positive test result indicating that the light source is operational, or that the light source operates correctly or in compliance with a predetermined performance specification if:
  the first and second images are determined to be images of the same scene;
  one or more of the camera setting differences comply with the corresponding predetermined criterion; and
  one or more of the image property differences comply with the corresponding predetermined criterion.

The method may comprise determining a negative test result indicating that the light source is non-operational, or that the light source is faulty or fails to comply with a predetermined performance specification if:
  the first and second images are determined to be images of the same scene; and at least one of:

one or more of the camera setting differences fails to comply with the corresponding predetermined criterion; and one or more of the image property differences fails to comply with the corresponding predetermined criterion.

The method may comprise determining a positive test result indicating that the light source is operational, or that the light source operates correctly or in compliance with a predetermined performance specification if:

the first and second images are determined to be images of the same scene;

the second image has a localised feature or artefact of a greater brightness than one or more adjacent areas or regions of the second image; and the first image has no localised feature or artefact of a greater brightness than one or more adjacent areas or regions of the first image, which localised feature or artefact of the first image is located at a position in the first image that corresponds to a position of the localised feature or artefact in the second image.

The method may comprise determining a negative test result indicating that the light source is non-operational, or that the light source is faulty or fails to comply with a predetermined performance specification if:

it is determined that the first and second images are images of the same scene;

the second image has a localised feature or artefact of a greater brightness than one or more adjacent areas or regions of the second image; and the first image has a localised feature or artefact of a greater brightness than one or more adjacent areas or regions of the first image, which localised feature or artefact of the first image is located at a position in the first image that corresponds to a position of the localised feature or artefact in the second image.

The method may comprise using an image processing algorithm such as a machine learning algorithm to identify any localised feature or artefact of a greater brightness than one or more adjacent areas or regions of the first and/or second images.

The method may comprise determining an inconclusive test result for the operational status of the light source if it is determined that the first and second images are not images of the same scene.

Determining whether the first and second images are images of the same scene may comprise:

comparing the first and second images; and determining whether the first and second images correspond to images of the same scene based on the results of the comparison of the first and second images.

Determining whether the first and second images are images of the same scene may comprise:

identifying an object in the first image; and identifying the same object in the second image.

Determining whether the first and second images are images of the same scene may comprise using an image processing algorithm to identify the object in the first image and to identify the same object in the second image. The image processing algorithm may be based on a machine learning algorithm.

Determining whether the first and second images are images of the same scene may comprise:

determining, for each of one or more properties of the object, a first value for the property of the object from the first image and a second value for the property of the object from the second image; and determining that the first and second images are images of the same scene if, for each of the one or more properties of the object, the first and second values for the property of the object comply with a corresponding predetermined criterion.

Determining whether the first and second images are images of the same scene may comprise:

determining, for each of the one or more properties of the object, a difference between the determined first and second values for the property of the object; and determining that the first and second images are images of the same scene if, for each of the one or more properties of the object, the determined difference between the determined first and second values for the property of the object is less than a corresponding predetermined threshold value.

The one or more properties of the object may comprise one or more of: a size of the object, an aspect ratio of the object, a position of the object and an orientation of the object.

Determining whether the first and second images are images of the same scene may comprise:

determining a quantitative degree of similarity between the first and second images; and determining that the first and second images are images of the same scene if the quantitative degree of similarity between the first and second images complies with a predetermined image similarity criterion.

Determining whether the first and second images are images of the same scene may comprise determining that the first and second images are images of the same scene if a difference between the quantitative degree of similarity between the first and second images is less than a predetermined threshold value.

The quantitative degree of similarity between the first and second images may comprise a cross-correlation between the first and second images or a cross-correlation between corresponding portions of the first and second images.

Determining whether the first and second images are images of the same scene may comprise:

determining a distance from the camera to an object located at a predetermined position in the first image;

determining a distance from the camera to an object located at a predetermined position in the second image, which predetermined position in the second image corresponds to the predetermined position in the first image; and determining that the first and second images are images of the same scene if the determined distance from the camera to the object at the predetermined position in the first image and the determined distance from the camera to the object at the predetermined position in the second image comply with a predetermined distance criterion.

Determining whether the first and second images are images of the same scene may comprise determining that the first and second images are images of the same scene if a difference between the determined distance from the camera to the object at the predetermined position in the first image and the determined distance from the camera to the object at the predetermined position in the second image is less than a predetermined threshold value.

Determining whether the first and second images are images of the same scene may comprise:

measuring a distance from the camera to the object at the time of capture of the first image; and measuring a distance from the camera to the object at the time of capture of the second image.

Measuring the distance from the camera to the object at the time of capture of each of the first and second images may comprise executing an augmented reality (AR) application on a computing device. Such an application may comprise a third-party AR library, such as ARCore, which provides an application programming interface (API) to the AR application. The computing device may be configured for communication with the camera. Further, the camera may form part of, be defined by, or be fixed or attached to, the computing device.

Measuring the distance from the camera to the object at the time of capture of each of the first and second images may comprise:
  transmitting modulated electromagnetic radiation from an emitter to the object and receiving modulated electromagnetic radiation reflected from the object at a detector; and
  determining a delay between emitting the modulated electromagnetic radiation from the emitter and detecting the reflected modulated electromagnetic radiation at the receiver,
  wherein the emitter and the detector have a fixed spatial relationship with respect to each other.

The emitter and the detector may have a fixed spatial relationship with respect to the camera. The emitter and the detector may be fixed or attached to the camera.

The modulated electromagnetic radiation may comprise amplitude modulated electromagnetic radiation.

The modulated electromagnetic radiation may comprise a stream of pulses of electromagnetic radiation.

The modulated electromagnetic radiation may comprise frequency modulated electromagnetic radiation.

The electromagnetic radiation may comprise light, for example visible or infrared (IR) light.

The emitter may comprise a light emitter.

The light emitter may comprise a light emitting diode (LED). The light emitter may comprise a source of coherent light such as a laser, for example a laser diode.

The emitter may comprise one or more LEDs.

The emitter may comprise one or more laser diodes.

The detector may comprise an optical detector such as a photodiode.

The detector may comprise a time of flight (ToF) camera.

Determining whether the first and second images are images of the same scene may comprise:
  measuring any movements of the camera between a time of capture of the first image and a time of capture of the second image; and
  determining that the first and second images are images of the same scene if the size of any movements of the camera comply with one or more predetermined movement criteria.

Determining whether the first and second images are images of the same scene may comprise determining that the first and second images are images of the same scene if the size of any movements of the camera are less than one or more predetermined threshold values.

Determining whether the first and second images are images of the same scene may comprise:
  determining a location and orientation of the camera at the time of capture of each of the first and second images; and
  determining that the first and second images are images of the same scene if the determined locations of the camera at the times of capture of the first and second images comply with a predetermined location criterion and the determined orientations of the camera at the times of capture of the first and second images comply with a corresponding predetermined orientation criterion.

Determining whether the first and second images are images of the same scene may comprise determining that the first and second images are images of the same scene if a difference between the determined locations of the camera at the times of capture of the first and second images are less than a corresponding predetermined location threshold value and a difference between the determined orientations of the camera at the times of capture of the first and second images are less than a corresponding predetermined orientation threshold value.

The light source may comprise a camera flash provided with, housed with, or fixed or attached to, the camera.

The camera and the light source may form part of, be defined by, or be fixed or attached to, a device such as a computing device.

The computing device may be a mobile electronic device comprising a mobile phone, a smart phone, a cell phone, or a tablet, for example. The computing device may be a desktop computer, a laptop computer, or a workstation. The computing device may be an Internet-of-Things (IoT) device such as a smart home appliance or a smart security device.

The camera and the light source may form part of, be defined by, or be fixed or attached to, a security system for a building, a fixed structure, or an enclosed area or space.

The camera and the light source may form part of, be defined by, or be fixed or attached to, a vehicle.

The light source may comprise, or be defined by, a light source provided with the vehicle such as a head light or a tail light of the vehicle.

According to an aspect of the present disclosure there is provided an application for a mobile electronic device comprising a camera and a light source, or for a server configured for communication with a mobile electronic device comprising a camera and a light source, wherein, when executed by a processor of the mobile electronic device or a processor of the server, the application causes the mobile electronic device to perform any of the methods described above.

According to an aspect of the present disclosure there is provided a mobile electronic device comprising the application as described above.

According to an aspect of the present disclosure there is provided a server comprising the application as described above.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

Various apparatus and methods for use in testing the operational status of a light source will now be described by way of non-limiting example only with reference to the following drawings of which.

DETAILED DESCRIPTION OF THE DRAWINGS

Figure 1:
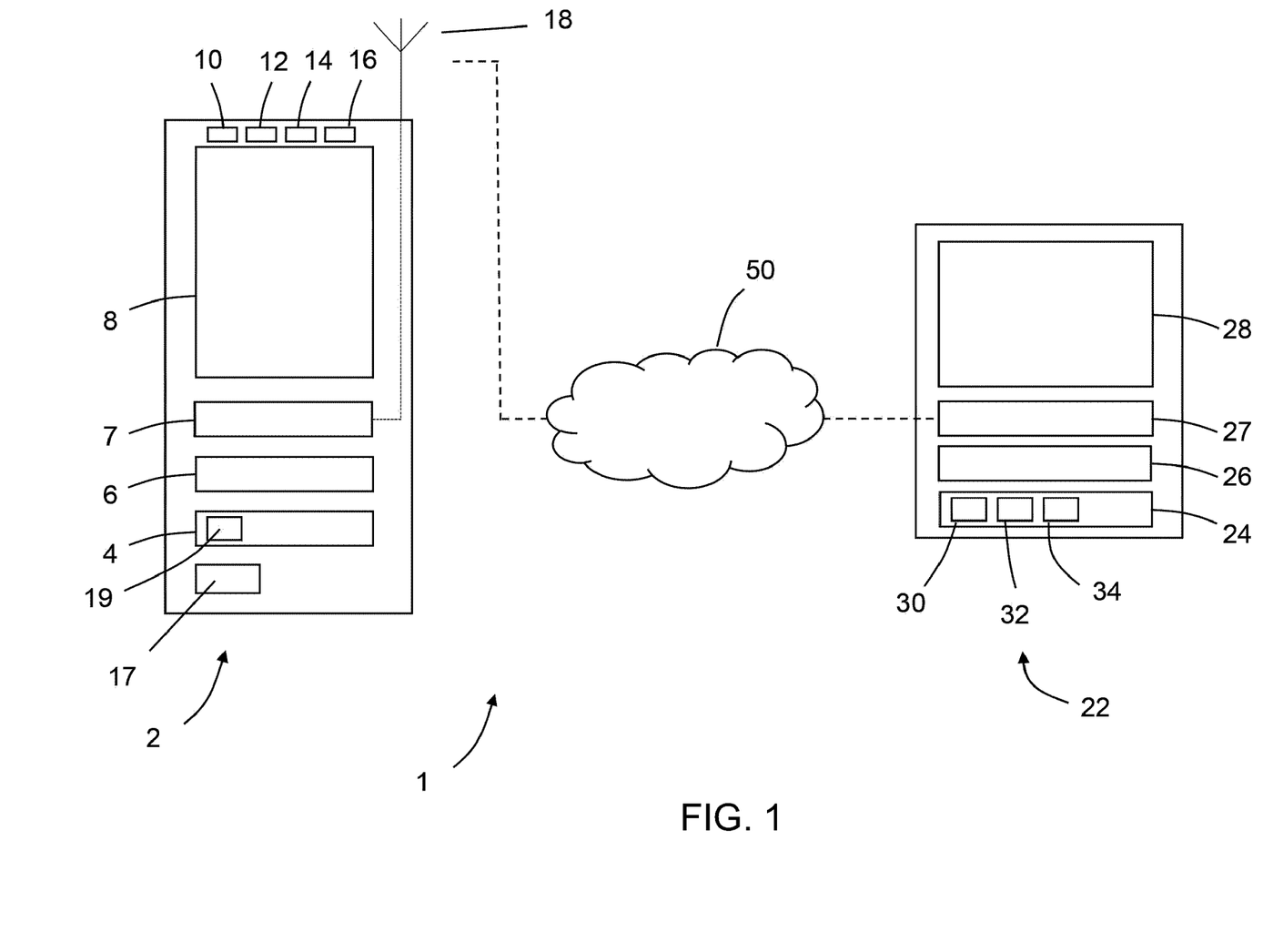
FIG. 1 is a schematic of a mobile electronic device and a system for use in automatically testing the operational status of a camera flash of the mobile electronic device.

Referring initially to FIG. 1 there is shown a system, generally designated 1, for use in automatically testing the operational status of a camera flash of the mobile electronic device 2. The mobile electronic device 2 includes a memory 4, a processor 6, a communication interface 7, a user interface in the form of a touchscreen 8, a camera 10, a light source in the form of a camera flash 12, an infrared (IR) source in the form of an infrared light emitting diode (LED) 14, a photodiode 16 which is configured for detection of infrared light emitted by the LED 14 and reflected back onto the photodiode 16, a motion sensor in the form of an accelerometer 17 and an antenna 18. The memory 4 stores a diagnostics application 19.

The system 1 includes a server which is generally designated 22 and which is located remotely from the mobile electronic device 2. The server 22 includes a memory 24, a processor 26, a communication interface 27, and a user interface 28. The memory 24 stores a computer program in the form of a diagnostics application 30, data 32 relating to one or more images captured by the mobile electronic device 2, and diagnostic information 34 relating to the operational status of the camera flash 12 of the mobile electronic device 2.

As shown in FIG. 1, the mobile electronic device 2 and the server 22 are configured for communication over the cloud 50 via the communication interface 7 and antenna 18 of the mobile electronic device 2 and the communication interface 27 of the server 22.

When executed by the processor 6 of the mobile electronic device 2, the diagnostics application 19 causes the mobile electronic device 2 to perform a method for automatically testing the operational status of the camera flash 12 of the mobile electronic device 2.

Figure 2:
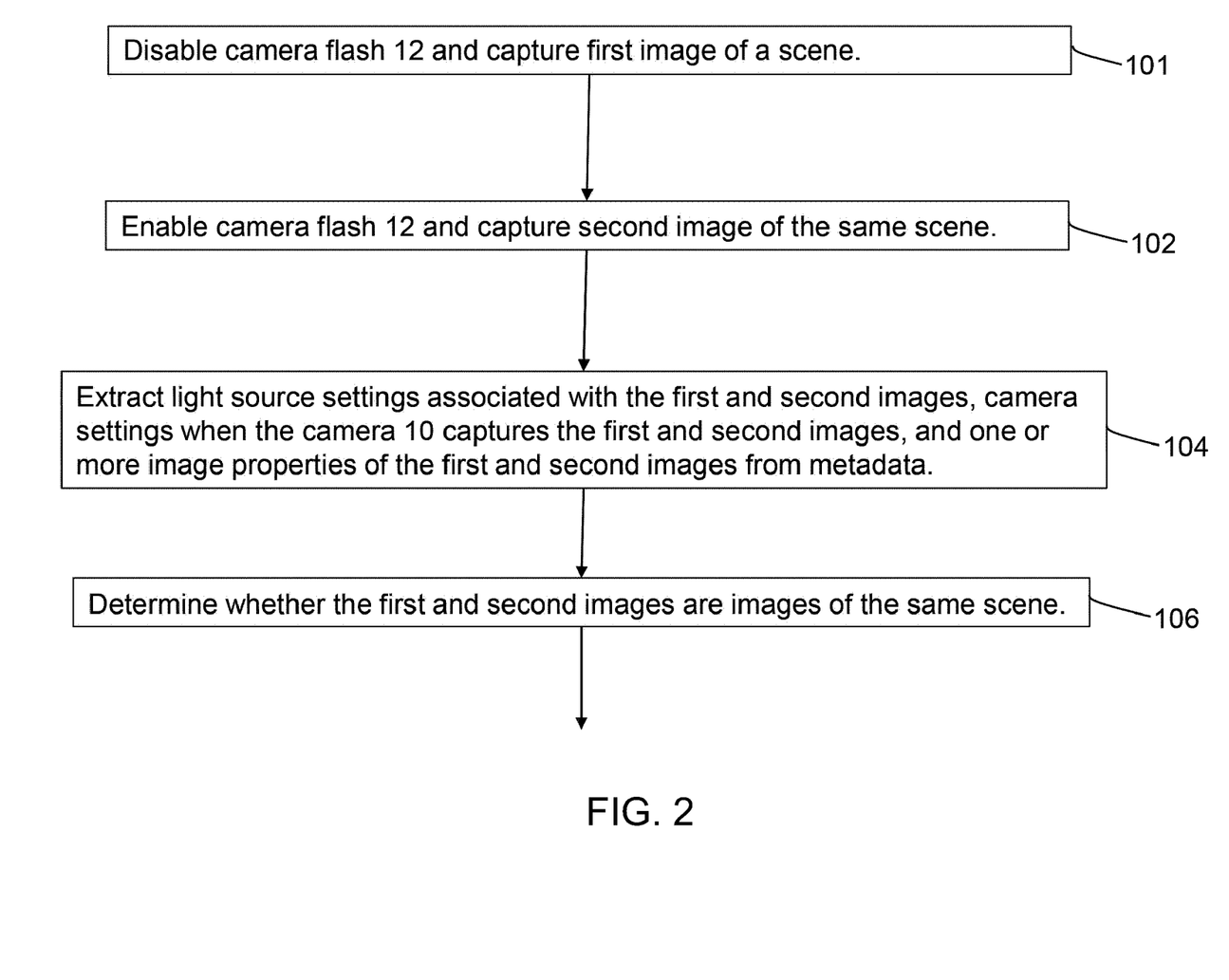
FIG. 2 is a flow chart illustrating the initial steps of a method for automatically testing the operational status of the camera flash of the mobile electronic device shown in FIG. 1.

As illustrated in FIG. 2, the method 100 begins at step 101 with the mobile electronic device 2 disabling the camera flash 12 and prompting a user of the mobile electronic device 2, via the user interface 8, to use the camera 10 to capture a first image 60 of a scene. The method continues at step 102 with the mobile electronic device 2 enabling the camera flash 12 and prompting the user, via the user interface 8, to use the camera 10 to capture a second image 62 of the same scene.

As will be described in more detail below, the processor 6 of the mobile electronic device 2 then determines a test result indicating the operational status of the camera flash 12 based at least in part on a light source setting indicating that the camera flash 12 is disabled when the camera 10 captures the first image, a light source setting indicating that the light source is enabled when the camera captures the second image, one or more camera settings when the camera 10 captures the first and second images, and one or more image properties of the first and second images.

Specifically, at step 104, the processor 6 of the mobile electronic device 2 extracts from metadata provided with the image data of the first and second images: the light source settings associated with the first and second images; the camera settings when the camera 10 captures the first and second images; and the one or more image properties of the first and second images. Specifically, the processor 6 of the mobile electronic device 2 extracts or accesses the metadata provided with the image data of the first and second images programmatically via an application programming interface (API) for the camera 10.

Figure 3:
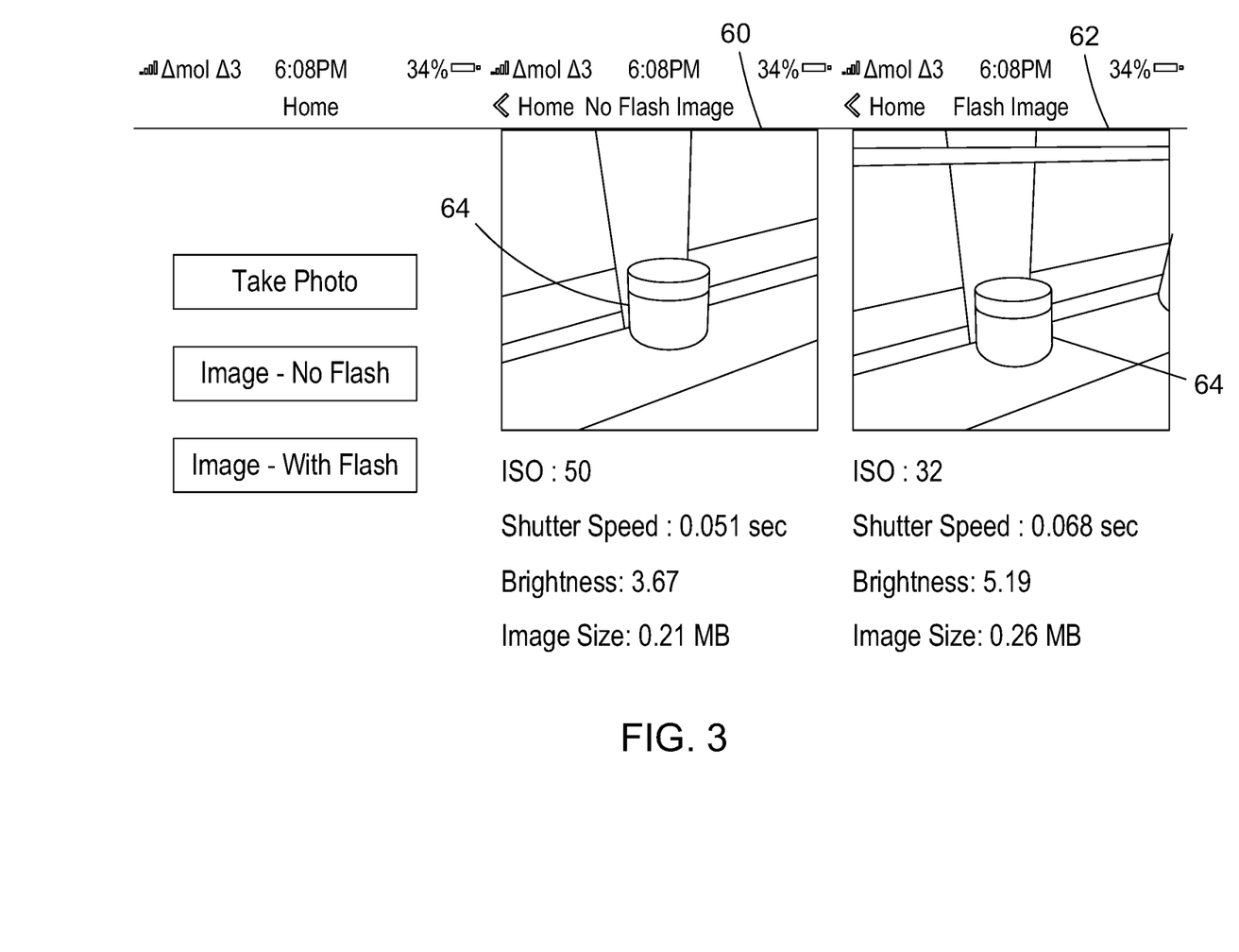
FIG. 3 shows a first image captured when the camera flash of the mobile electronic device shown in FIG. 1 is disabled together with some associated camera setting values and image property values and a second image captured when the camera flash of the mobile electronic device shown in FIG. 1 is enabled together with some associated camera setting values and image property values.

As illustrated in FIG. 3, the camera settings include an ISO setting and a shutter speed or an exposure time used by the camera when the camera 10 captures the first and second images 60, 62, and the image properties include image brightness parameter values associated with the first and second images 60, 62 and image file sizes of the first and second images 60, 62. The one or more brightness parameter values of each of the first and second images 60, 62 may, for example, comprise an average brightness or an average intensity of each of the first and second images 60, 62 or an average brightness or an average intensity of a pre-defined portion or a pre-defined area of each of the first and second images 60, 62.

The method continues at step 106 of FIG. 2 with the processor 6 of the mobile electronic device 2 then determining whether the first and second images are images of the same scene. Specifically, the processor 6 of the mobile electronic device 2 compares the first and second images 60, 62 and determines whether the first and second images correspond to images of the same scene based on the results of the comparison of the first and second images. More specifically and, with reference to FIG. 4, the processor 6 of the mobile electronic device 2 determines a distance from the camera 10 to an object 64 located at a predetermined position in the first image 60 and the processor 6 determines a distance from the camera 10 to the object 64 located at a predetermined position in the second image 62, which predetermined position in the second image 62 corresponds to the predetermined position in the first image 60. The processor 6 then determines that the first and second images 60, 62 are images of the same scene if the determined distance from the camera 10 to the object 64 at the predetermined position in the first image 60 and the determined distance from the camera 10 to the object 64 at the predetermined position in the second image 62 comply with a predetermined distance criterion. For example, the processor 6 determines that the first and second images 60, 62 are images of the same scene if a difference between the determined distance from the camera 10 to the object 64 at the predetermined position in the first image 60 and the determined distance from the camera 10 to the object 64 at the predetermined position in the second image 62 is less than a predetermined threshold value. The processor 6 causes the camera 10 to measure the distance from the camera 10 to the object 64 at the time of capture of the first image 60 and to measure the distance from the camera 10 to the object 64 at the time of capture of the second image 62. More specifically, the processor 6 causes the LED 14 to transmit modulated infrared light to the object 64 and the processor 6 causes the photodiode 16 to detect a portion of the transmitted modulated infrared light that is reflected from the object 64. The processor 6 then determines the distance from the camera 10 from the delay between transmitting the modulated infrared light from the LED 14 and detecting the reflected modulated infrared light at the photodiode 16. One of ordinary skill in the art will understand that a variety of distance measurement techniques are possible using modulated infrared light.

Figure 4:
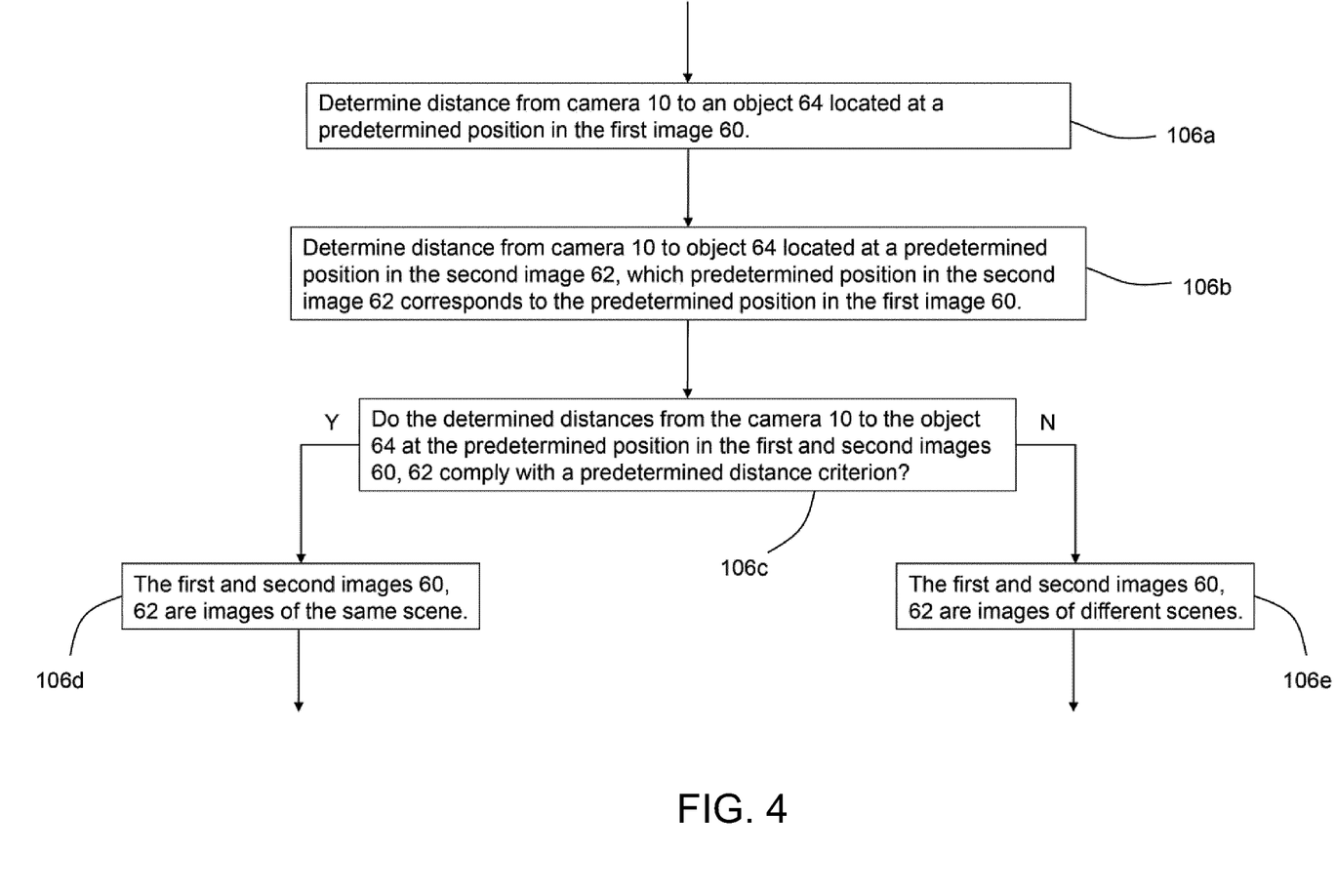
FIG. 4 is a flow chart illustrating a step of the method for automatically testing the operational status of the camera flash of the mobile electronic device, the step comprising determining whether the first and second images are images of the same scene.

For example, the modulated infrared light may be amplitude modulated and the distance from the camera 10 to the object 64 may be determined from the delay between transmitting an amplitude modulated feature of the amplitude modulated infrared light from the LED 14 and the arrival of the same amplitude modulated feature of amplitude modulated infrared light at the photodiode 16. The amplitude modulated infrared light may, for example, comprise a stream of pulses of infrared light and the distance from the camera 10 to the object 64 may be determined from the delay between transmitting a pulse of infrared light from the LED 14 and the arrival of the same pulse of infrared light at the photodiode 16. Alternatively, the modulated infrared light may be frequency modulated and the distance from the camera 10 to the object 64 may be determined from a delay determined from a difference between a frequency of the frequency modulated infrared light transmitted from the LED 14 and a frequency of the frequency modulated infrared light arriving at the photodiode 16. Additionally or alternatively, the processor 6 causes an augmented reality (AR) application to measure the distance from the camera 10 to the object 64 at the time of capture of the first image 60 and to measure the distance from the camera 10 to the object 64 at the time of capture of the second image 62. More specifically, the processor 6 executes an AR application causing the camera to first quantify the dimensional space between the camera 10 and the object 64 and then to measure the distance from the camera 10 to the object 64. Such an application may comprise a third-party AR library, such as ARCore, which provides an application programming interface (API) to the AR application.

Figure 5:
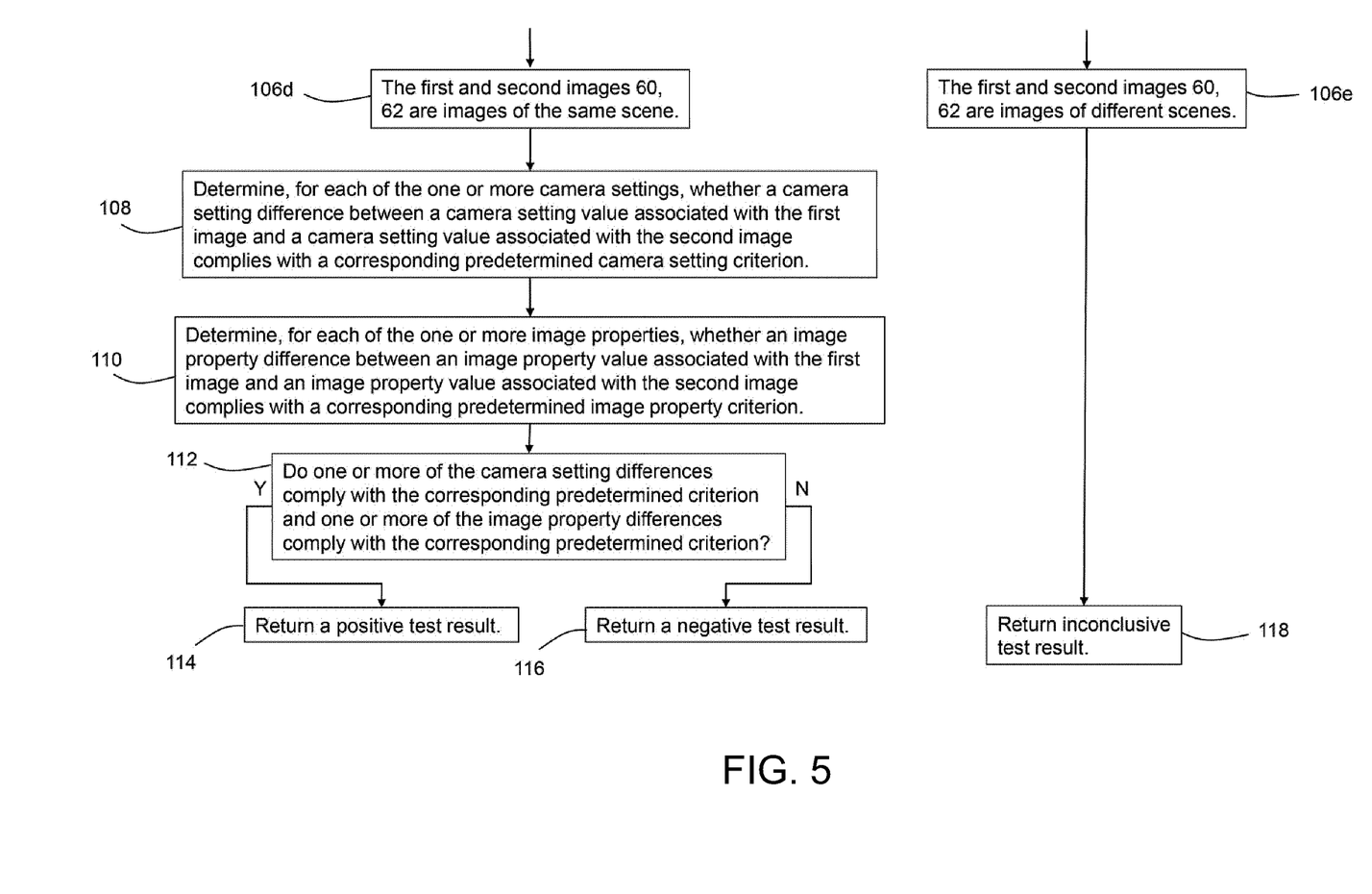
FIG. 5 is a flow chart illustrating the final steps of the method for automatically testing the operational status of the camera flash of the mobile electronic device shown in FIG. 1.

Referring now to FIG. 5, the method continues at step 108 with the processor 6 determining, for each of the one or more camera settings, whether a camera setting difference between a camera setting value associated with the first image 60 and a camera setting value associated with the second image 62 complies with a corresponding predetermined camera setting criterion. Similarly, at step 110, the processor 6 determines, for each of the one or more image properties, whether an image property difference between an image property value associated with the first image 60 and an image property value associated with the second image 62 complies with a corresponding predetermined image property criterion.

At step 112, the processor 6 determines whether one or more of the camera setting differences comply with the corresponding predetermined criterion and whether one or more of the image property differences comply with the corresponding predetermined criterion.

If the processor 6 determines that one or more of the camera setting differences comply with the corresponding predetermined criterion and that one or more of the image property differences comply with the corresponding predetermined criterion, at step 114 the processor 6 determines a positive test result indicating that the light source is operational, or that the light source operates correctly or in compliance with a predetermined performance specification and returns the positive test result to a user of the mobile electronic device 2 via the user interface 8 and/or returns the positive test result to the server 22 via the communication interfaces 7, 27 and the cloud 50 for storage as the diagnostic information 34 in the memory 24 of the server 22.

If the processor 6 determines that one or more of the camera setting differences fails to comply with the corresponding predetermined criterion or that one or more of the image property differences fails to comply with the corresponding predetermined criterion, at step 116 the processor 6 determines a negative test result indicating that the light source is non-operational, or that the light source is faulty or fails to comply with a predetermined performance specification and returns the negative test result to a user of the mobile electronic device 2 via the user interface 8 and/or returns the negative test result to the server 22 via the communication interfaces 7, 27 and the cloud 50 for storage as the diagnostic information 34 in the memory 24 of the server 22.

If at step 106*c*, the processor 6 determines the determined distances from the camera 10 to the object 64 at the predetermined position in the first and second images 60, 62 do not comply with the corresponding predetermined criterion, the processor 6 determines that the first and second images 60, 62 are images of different scenes at step 106*e*. At step 118, the processor 6 then determines that the test result is inconclusive and returns the inconclusive test result to a user of the mobile electronic device 2 via the user interface 8 and/or returns the inconclusive test result to the server 22 via the communication interfaces 7, 27 and the cloud 50 for storage as the diagnostic information 34 in the memory 24 of the server 22.

In one specific example of the method for automatically testing the operational status of the camera flash 12 of the mobile electronic device 2 described with reference to FIGS. 2-5, the one or more camera settings extracted from the metadata of the first and second images 60, 62 may comprise an ISO setting of the camera 10 and a shutter speed setting of the camera 10, the one or more image properties extracted from the metadata of the first and second images 60, 62 may comprise a brightness parameter and an image file size, and experiments with several different makes and models of smartphone have demonstrated that the camera flash 12 can be considered to be operational if at least two of the following predetermined criteria are satisfied:
  (i) the ISO setting value when the camera 10 captures the first image 60 is less than the ISO setting value when the camera 10 captures the second image 62;
  (ii) the shutter speed setting value when the camera 10 captures the first image 60 is less than the shutter speed setting value when the camera 10 captures the second image 62;
  (iii) the image brightness parameter value when the camera 10 captures the first image 60 is greater than the image brightness parameter value when the camera 10 captures the second image 62; and (iv) the image file size value when the camera 10 captures the first image 60 is greater than the image file size value when the camera 10 captures the second image 62.

Conversely, the camera flash 12 can be considered to be non-operational if one or none of the predetermined criteria (i)-(iv) above are satisfied.

Figure 6:
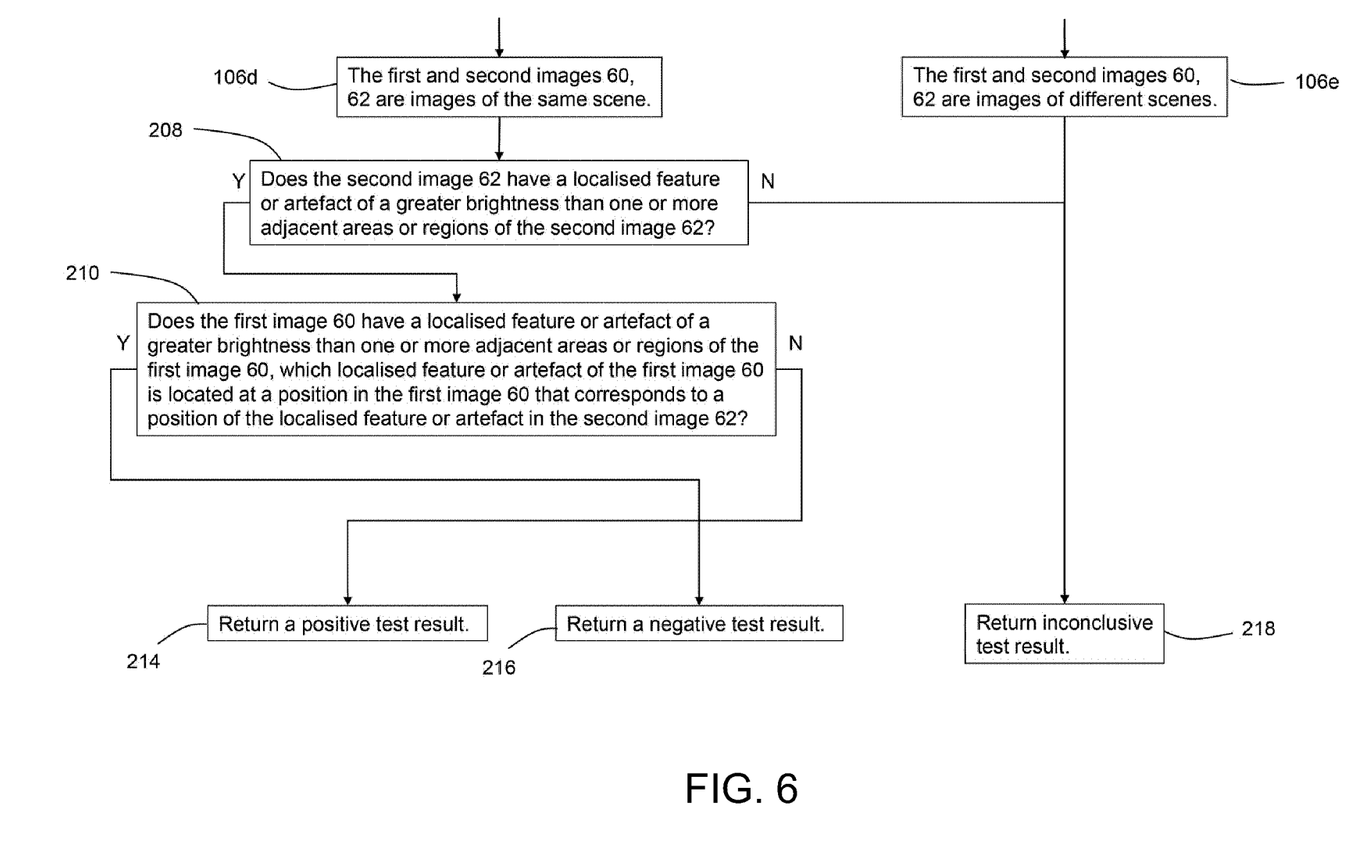
FIG. 6 is a flow chart illustrating some alternative final steps of the method for automatically testing the operational status of the camera flash of the mobile electronic device shown in FIG. 1.

In a variant of the method for automatically testing the operational status of the camera flash 12 of the mobile electronic device 2 described with reference to FIGS. 2-5, the steps 108, 110, 112, 114, 116 and 118 illustrated in FIG. 5 may be replaced with the steps 208, 210, 214, 216 and 218 illustrated in FIG. 6. Specifically, at step 208, the processor 6 determines whether the second image 62 has a localised feature or artefact of a greater brightness than one or more adjacent areas or regions of the second image 62. Such a localised feature or artefact of greater brightness than the one or more adjacent areas or regions of the second image 62 may arise as a result of a reflection such as a specular reflection of the camera flash 12 from an object in the scene.

If the processor 6 determines that the second image 62 has a localised feature or artefact of a greater brightness than one or more adjacent areas or regions of the second image 62 at step 208, the method continues at step 210 with the processor 6 determining whether the first image 60 has a localised feature or artefact of a greater brightness than one or more adjacent areas or regions of the first image 60, which localised feature or artefact of the first image 60 is located at a position in the first image 60 that corresponds to a position of the localised feature or artefact in the second image 62.

If the processor 6 determines that the first image 60 has a localised feature or artefact of a greater brightness than one or more adjacent areas or regions of the first image 60, which localised feature or artefact of the first image 60 is located at a position in the first image 60 that corresponds to a position of the localised feature or artefact in the second image 62 at step 210, the method returns a negative test result at step 216 indicating that the camera flash 12 is non-operational.

If the processor 6 determines that the first image 60 does not have a localised feature or artefact of a greater brightness than one or more adjacent areas or regions of the first image 60, which localised feature or artefact of the first image 60 is located at a position in the first image 60 that corresponds to a position of the localised feature or artefact in the second image 62 at step 210, the method returns a positive test result at step 214 indicating that the camera flash 12 is operational.

If the processor 6 determines that the second image 62 does not have a localised feature or artefact of a greater brightness than one or more adjacent areas or regions of the second image 62, the method returns an inconclusive test result at step 218. Similarly, if at step 106*c*, the processor 6 determines for each of the one or more properties of the object 64, that the determined first and second values for the property of the object 64 do not comply with the corresponding predetermined criterion, the processor 6 determines that the first and second images 60, 62 are images of different scenes at step 106*e* and the processor 6 determines an inconclusive test result at step 218.

In a first alternative to the method for determining whether the first and second images are images of the same scene of steps 106*a*-106*e* illustrated in FIG. 4, the processor 6 determines a quantitative degree of similarity between the first and second images 60, 62, and the processor 6 determines that the first and second images 60, 62 are images of the same scene if the quantitative degree of similarity between the first and second images 60, 62 comply with a predetermined image similarity criterion. For example, the processor 6 determines that the first and second images are images of the same scene if a difference between the quantitative degree of similarity between the first and second images is less than a predetermined threshold value. More specifically, the processor 6 determines a cross-correlation between the first and second images 60, 62 or a cross-correlation between corresponding portions of the first and second images 60, 62, and the processor 6 determines that the first and second images 60, 62 are images of the same scene if the cross-correlation between the first and second images 60, 62 complies with a predetermined cross-correlation criterion. For example, the processor 6 determines that the first and second images are images of the same scene if a difference between the cross-correlation between the first and second images is less than a predetermined threshold value.

In a second alternative to the method for determining whether the first and second images are images of the same scene of steps 106*a*-106*e* illustrated in FIG. 4, the processor 6 uses the accelerometer 17 to measure any movements of the mobile electronic device 2 (and therefore also the camera 10) between a time of capture of the first image 60 and a time of capture of the second image 62 and the processor 6 determines that the first and second images 60, 62 are images of the same scene if the size of any movements of the camera 10 comply with one or more predetermined movement criteria. For example, the processor 6 determines that the first and second images 60, 62 are images of the same scene if the size of any movements of the camera 10 are less than one or more corresponding predetermined threshold values.

In a third alternative to the method for determining whether the first and second images are images of the same scene of steps 106*a*-106*e* illustrated in FIG. 4, the processor 6 determines a location and orientation of the mobile electronic device 2 (and therefore also the camera 10) at the time of capture of each of the first and second images 60, 62 from one or more signals received wirelessly by the antenna 18 from one or more cellular base stations and/or from one or more satellites such as one or more GPS satellites. The processor 6 then determines that the first and second images 60, 62 are images of the same scene if the determined locations of the camera 10 at the times of capture of the first and second images 60, 62 comply with a predetermined location criteria and the determined orientations of the camera 10 at the times of capture of the first and second images 60, 62 comply with a corresponding predetermined orientation criteria. For example, the processor 6 determines that the first and second images 60, 62 are images of the same scene if a difference between the determined locations of the camera 10 at the times of capture of the first and second images 60, 62 is less than a corresponding predetermined location threshold value and a difference between the determined orientations of the camera 10 at the times of capture of the first and second images 60, 62 is less than a corresponding predetermined orientation threshold value.

Figure 7:
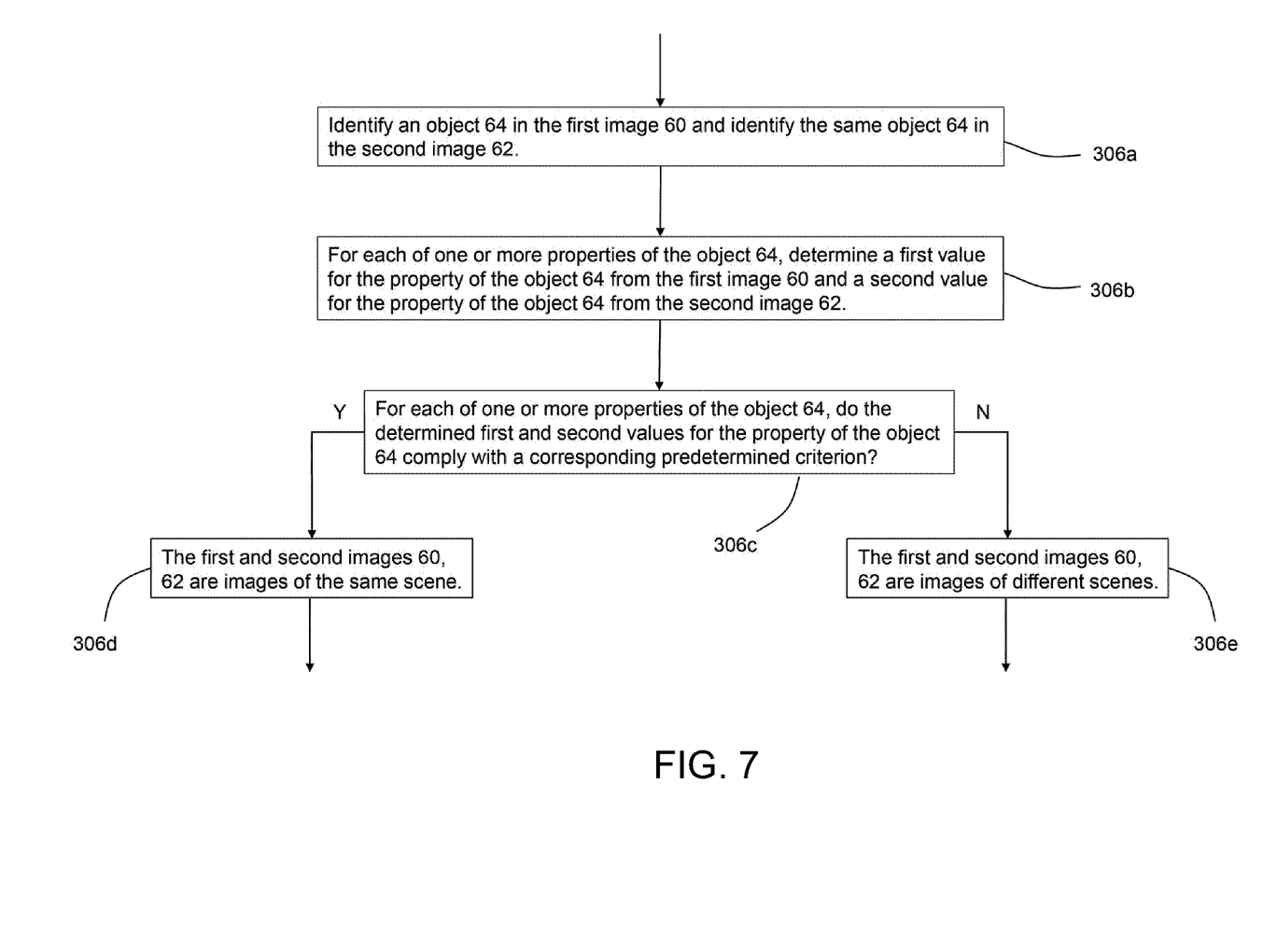
FIG. 7 is a flow chart illustrating an alternative method for determining whether the first and second images are images of the same scene.

A fourth alternative to the method for determining whether the first and second images are images of the same scene of steps 106*a*-106*e* illustrated in FIG. 4, is now described with reference to FIG. 7. In the fourth alternative method for determining whether the first and second images are images of the same scene, the processor 6 identifies at step 306*a* an object 64 in the first image 60 and identifies the same object 64 in the second image 62. For example, the processor 6 may use an image processing algorithm to identify the object 64 in the first image 60 and to identify the same object 64 in the second image 62. The image processing algorithm may, for example, be based on a machine learning algorithm. At step 306b, the processor 6 determines, for each of one or more properties of the object 64, a first value for the property of the object 64 from the first image 60 and a second value for the property of the object 64 from the second image 62. The one or more properties of the object may, for example, include one or more of a size of the object 64, an aspect ratio of the object 64, a position of the object 64, and an orientation of the object 64.

The processor 6 then determines at step 306c whether, for each of the one or more properties of the object 64, the determined first and second values of the property of the object 64 comply with a corresponding predetermined criterion. For example, the processor 6 determines, for each of the one or more properties of the object 64, a difference between the determined first and second values of the property of the object 64, and the processor 6 determines whether, for each of the one or more properties of the object 64, the determined difference between the determined first and second values of the property of the object 64 is less than a corresponding predetermined threshold value. If at step 306c, the processor 6 determines that the determined first and second values of the property of the object 64 comply with the corresponding predetermined criterion for each of the one or more properties of the object 64, the processor 6 determines that the first and second images 60, 62 are images of the same scene at step 306d. If at step 306c, the processor 6 determines for each of the one or more properties of the object 64, that the determined first and second values for the property of the object 64 do not comply with the corresponding predetermined criterion, the processor 6 determines that the first and second images 60, 62 are images of different scenes at step 306e.

Various modifications are possible to the apparatus and methods described above with departing from the scope defined by the appended claims. For example, in an alternative method to any of the methods described with reference to FIGS. 2-7 for automatically testing the operational status of the camera flash 12 of the mobile electronic device 2, the mobile electronic device 2 may enable the camera flash 12 and prompt a user of the mobile electronic device 2 to use the camera 10 to capture a first image of a scene. This alternative method may continue with the mobile electronic device 2 disabling the camera flash 12 and prompting the user to use the camera 10 to capture a second image of the same scene. It is an advantage of this alternative method that any technical limitations preventing normal operation of the camera flash 12 may be detected before capturing any images. Such technical limitations may include low charge of a battery of the mobile electronic device 2 or any restrictions set on the use of the camera flash 12 by the diagnostics application 19, for example.

Rather than the processor 6 of the mobile electronic device 2 executing diagnostics application 19 thereby causing the mobile electronic device 2 to perform the method for automatically testing the operational status of the camera flash 12 of the mobile electronic device 2 as described with reference to FIGS. 2-7, the processor 26 of the server 22 may execute the diagnostics application 30 thereby causing the server 22 to communicate with the mobile electronic device 2 via the communication interfaces 7, 27 and the cloud 50 to cause the mobile electronic device 2 to perform the method for automatically testing the operational status of the camera flash 12 of the mobile electronic device 2 as described with reference to FIGS. 2-7.

The one or more camera settings may comprise an aperture setting, an f-stop, or an f-number.

The method may comprise reading the light source settings, the one or more camera settings, and the one or more image properties for the first and second images from the camera.

The method may comprise comprising reading the first and second images from the camera.

The method may comprise determining the image properties of the first and second images from the image data of the first and second images.

The method may comprise selecting each predetermined camera setting criterion and each predetermined image property criterion based at least in part on the corresponding camera setting value and/or the corresponding image property value when the camera captures the first image. This may be advantageous where the first image captures a scene which is relatively bright.

The mobile electronic device may comprise a mobile phone, a smart phone, a cell phone, or a tablet.

The camera and the light source may be fixed or attached in a fixed spatial relationship to an object or a device other than a mobile electronic device.

The camera and the light source may form part of, or be defined by, or be fixed or attached to, a security system for a building, a fixed structure, or an enclosed area or space.

The camera and the light source may form part of, or be defined by, or be fixed or attached to, a vehicle.

The light source may comprise, or be defined by, a light source provided with a vehicle such as a head light or a tail light of a vehicle.

One of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The invention claimed is:

1. A method for use in testing an operational status of a light source for illuminating a scene, the light source having a fixed spatial relationship relative to a camera, and the method comprising:
   using the camera to capture a first image when the light source is disabled;
   using the camera to capture a second image when the light source is enabled;
   determining whether the first and second images are images of the same scene; and
   determining a test result indicating the operational status of the light source based on one or more of:
   a light source setting when the camera captures each of the first and second images, the light source setting indicating whether the light source is disabled or enabled when the camera captures the first and second images; and
   one or more camera settings when the camera captures the first and second images; and
   one or more image properties of the first and second images.

2. The method of claim 1, wherein the one or more camera settings comprises at least one of:
   an ISO setting of an image sensor of the camera, an exposure index of an image sensor of the camera, a sensitivity setting of an image sensor of the camera, or a gain setting of an image sensor of the camera;
a shutter speed or an exposure time of the camera; and
an aperture setting, an f-stop, or an f-number of the camera.

3. The method of claim 1, wherein the one or more image properties comprise at least one of:
an image brightness parameter representative of an average brightness of an image or an average intensity of an image, or representative of an average brightness or an average intensity of a pre-defined portion or a pre-defined area of an image; and an image file size.

4. The method of claim 1, comprising reading the first and second images from the camera.

5. The method of claim 1, comprising extracting from metadata associated or stored with each of the first and second images, the light source settings, the one or more camera settings, and the one or more image properties for each of the first and second images.

6. The method of claim 1, comprising:
determining, for each of the one or more camera settings, whether a camera setting difference between a camera setting value associated with the first image and a camera setting value associated with the second image complies with a corresponding predetermined camera setting criterion; and
determining, for each of the one or more image properties, whether an image property difference between an image property value associated with the first image and an image property value associated with the second image complies with a corresponding predetermined image property criterion.

7. The method of claim 6, comprising selecting each predetermined camera setting criterion and each predetermined image property criterion based at least in part on the corresponding camera setting value and/or the corresponding image property value when the camera captures the first image.

8. The method of claim 6, comprising determining a positive test result indicating that the light source is operational, or that the light source operates correctly or in compliance with a predetermined performance specification if:
the first and second images are determined to be images of the same scene; one or more of the camera setting differences comply with the corresponding predetermined criterion; and
one or more of the image property differences comply with the corresponding predetermined criterion.

9. The method of claim 6, comprising determining a negative test result indicating that the light source is non-operational, or that the light source is faulty or fails to comply with a predetermined performance specification if:
the first and second images are determined to be images of the same scene; and at least one of:
one or more of the camera setting differences fails to comply with the corresponding predetermined criterion; and
one or more of the image property differences fails to comply with the corresponding predetermined criterion.

10. The method of claim 1, comprising determining a positive test result indicating that the light source is operational, or that the light source operates correctly or in compliance with a predetermined performance specification if:

the first and second images are determined to be images of the same scene;
the second image has a localised feature or artefact of a greater brightness than one or more adjacent areas or regions of the second image; and
the first image has no localised feature or artefact of a greater brightness than one or more adjacent areas or regions of the first image, which localised feature or artefact of the first image is located at a position in the first image that corresponds to a position of the localised feature or artefact in the second image.

11. The method of claim 10, comprising determining a negative test result indicating that the light source is non-operational, or that the light source is faulty or fails to comply with a predetermined performance specification if:
it is determined that the first and second images are images of the same scene;
the second image has a localised feature or artefact of a greater brightness than one or more adjacent areas or regions of the second image; and
the first image has a localised feature or artefact of a greater brightness than one or more adjacent areas or regions of the first image, which localised feature or artefact of the first image is located at a position in the first image that corresponds to a position of the localised feature or artefact in the second image.

12. The method of claim 10, comprising using an image processing algorithm such as a machine learning algorithm to identify any localised feature or artefact of a greater brightness than one or more adjacent areas or regions of the first and/or second images.

13. The method of any one of claim 1, comprising determining an inconclusive test result for the operational status of the light source if it is determined that the first and second images are not images of the same scene.

14. The method of claim 1, wherein determining whether the first and second images are images of the same scene comprises:
identifying an object in the first image, for example using an image processing algorithm such as a machine learning algorithm;
identifying the same object in the second image, for example using an image processing algorithm such as a machine learning algorithm;
determining, for each of one or more properties of the object, a first value for the property of the object from the first image and a second value for the property of the object from the second image; and
determining that the first and second images are images of the same scene if, for each of the one or more properties of the object, the first and second values for the property of the object comply with a corresponding predetermined criterion.

15. The method of claim 14, wherein the one or more properties of the object comprise one or more of: a size of the object, an aspect ratio of the object, a position of the object and an orientation of the object.

16. The method of claim 1, wherein determining whether the first and second images are images of the same scene comprises:
determining a quantitative degree of similarity such as a cross-correlation between the first and second images; and
determining that the first and second images are images of the same scene if the quantitative degree of similarity between the first and second images complies with a predetermined image similarity criterion.

17. The method of claim 1, wherein determining whether the first and second images are images of the same scene comprises:
- determining a distance from the camera to an object located at a predetermined position in the first image;
- determining a distance from the camera to an object located at a predetermined position in the second image, which predetermined position in the second image corresponds to the predetermined position in the first image; and
- determining that the first and second images are images of the same scene if the determined distance from the camera to the object at the predetermined position in the first image and the determined distance from the camera to the object at the predetermined position in the second image comply with a predetermined distance criterion.

18. The method of claim 17, wherein determining whether the first and second images are images of the same scene comprises:
- measuring a distance from the camera to the object at the time of capture of the first image; and
- measuring a distance from the camera to the object at the time of capture of the second image.

19. The method of claim 18, wherein measuring the distance from the camera to the object at the time of capture of each of the first and second images comprises:
- transmitting modulated electromagnetic radiation such as modulated light from an emitter to the object and receiving modulated electromagnetic radiation reflected from the object at a detector; and
- determining a delay between emitting the modulated electromagnetic radiation from the emitter and detecting the reflected modulated electromagnetic radiation at the receiver,
- wherein the emitter and the detector have a fixed spatial relationship with respect to each other.

20. The method of claim 1, wherein determining whether the first and second images are images of the same scene comprises:
- measuring any movements of the camera between a time of capture of the first image and a time of capture of the second image; and
- determining that the first and second images are images of the same scene if the size of any movements of the camera comply with one or more predetermined movement criteria.

21. The method of claim 1, wherein determining whether the first and second images are images of the same scene comprises:
- determining a location and orientation of the camera at the time of capture of each of the first and second images; and
- determining that the first and second images are images of the same scene if the determined locations of the camera at the times of capture of the first and second images comply with a predetermined location criterion and the determined orientations of the camera at the times of capture of the first and second images comply with a corresponding predetermined orientation criterion.

22. The method of claim 1, wherein the light source comprises a camera flash provided with, housed with, or fixed or attached to, the camera.

23. The method of claim 1, wherein the camera and the light source form part of, are defined by, or are fixed or attached to, a computing device such as a mobile phone, a smart phone, a cell phone, a tablet, a desktop computer, a laptop computer, a workstation or an Internet-of-Things (IoT) device.

24. An application for a mobile electronic device comprising a camera and a light source, or an application for a server configured for communication with a mobile electronic device which mobile electronic device comprises a camera and a light source, wherein, when executed by a processor of the mobile electronic device or a processor of the server, the application causes the mobile electronic device to perform the method as claimed in claim 1.

* * * * *